US009405327B2

(12) United States Patent
Huang

(10) Patent No.: US 9,405,327 B2
(45) Date of Patent: Aug. 2, 2016

(54) CONTROL METHOD AND CONTROL APPARATUS OF ELECTRONIC DEVICE, AND ELECTRONIC DEVICE

(71) Applicant: Sony Corporation, Tokyo (JP)

(72) Inventor: Di Huang, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/449,667

(22) Filed: Aug. 1, 2014

(65) Prior Publication Data

US 2015/0138141 A1    May 21, 2015

(30) Foreign Application Priority Data

Nov. 15, 2013   (CN) .......................... 2013 1 0573479

(51) Int. Cl.
*G06F 1/00*       (2006.01)
*G06F 1/16*       (2006.01)

(52) U.S. Cl.
CPC ............. *G06F 1/1684* (2013.01); *G06F 1/1626* (2013.01); *G06F 2203/04104* (2013.01); *G06F 2203/04106* (2013.01)

(58) Field of Classification Search
CPC ....... G06F 3/041; G06F 3/017; G06F 3/0488; G06F 3/033; G06F 3/038; G06F 3/0304
See application file for complete search history.

(56) References Cited

U.S. PATENT DOCUMENTS

2008/0165132 A1\* 7/2008 Weiss et al. .................... 345/173
2013/0241847 A1\* 9/2013 Shaffer et al. ................. 345/173
2014/0218343 A1\* 8/2014 Hicks ...................... G06F 3/033
                                                         345/179

\* cited by examiner

*Primary Examiner* — Michael Faragalla
(74) *Attorney, Agent, or Firm* — Renner, Otto, Boisselle & Sklar LLP.

(57) ABSTRACT

A control method and a control apparatus of an electronic device and the electronic device, wherein the control apparatus includes a detection unit configured to detect a user's contact with the electronic device, and acquire a detection result; a recognition unit configured to recognize a gesture of the user holding the electronic device according to the detection result; and a first control unit configured to generate a first control signal according to the gesture and a first correspondence between the gesture and the first control signal, the first control signal controlling the electronic device to perform a function corresponding to the first control signal. According to the control method and the control apparatus of the electronic device and the electronic device, a gesture of the user holding the electronic device is recognized, and a control signal for the electronic device is generated according to the gesture, so that the user conveniently controls the electronic.

14 Claims, 9 Drawing Sheets

CONTROL METHOD AND CONTROL APPARATUS OF ELECTRONIC DEVICE, AND ELECTRONIC DEVICE

CROSS-REFERENCE TO RELATED APPLICATION

This application claims priority from Chinese patent application No. 201310573479.3, filed Nov. 15, 2013, the entire disclosure of which hereby is incorporated by reference.

TECHNICAL FIELD

The present disclosure relates to electronic devices, and particularly, to a control method and a control apparatus of an electronic device, and the electronic device.

BACKGROUND

With the advancement of technologies and the improvement of people's living standard, electronic devices, such as smart phones and tablet computers, have become people's daily necessities. In the process of using an electronic device, the interaction between a user and the electronic device is usually performed through means such as a keyboard, a touch screen, a microphone and a camera built in or connected to the electronic device.

To be noted, the above introduction to the technical background is just made for the convenience of clearly and completely describing the technical solutions of the present disclosure, and to facilitate the understanding of a person skilled in the art. It shall not be deemed that the above technical solutions are known to a person skilled in the art just because they have been illustrated in the Background section of the present disclosure.

SUMMARY

When implementing the relevant art, the inventor of the present disclosure has found that when a control command is issued to an electronic device, a particular input operation shall be performed for the electronic device, e.g., completing a particular action on a touch screen, pressing a start control key of a camera or a microphone, etc., and sometimes multiple steps shall be performed to input a control command. However, on some occasions, a user may hope to issue the control command to the electronic device more conveniently.

The embodiments of the present disclosure provide a control method and a control apparatus of an electronic device and the electronic device, to more conveniently control the electronic device.

According to a first aspect of the embodiments of the present disclosure, a control apparatus of an electronic device is provided, including:

a detection unit configured to detect a user's contact with the electronic device, and acquire a detection result;

a recognition unit configured to recognize a gesture of the user holding the electronic device according to the detection result; and a first control unit configured to generate a first control signal according to the gesture and a first correspondence between the gesture and the first control signal, the first control signal controlling the electronic device to perform a function corresponding to the first control signal.

According to a second aspect of the embodiments of the present disclosure, wherein, the detection result includes a contact position, a contact area and/or a contact pressure.

According to a third aspect of the embodiments of the present disclosure, wherein the control apparatus further includes:

a first correspondence generation unit configured to generate the first correspondence according to a second correspondence between a running status of the electronic device and the gesture.

According to a fourth aspect of the embodiments of the present disclosure, wherein the control apparatus further includes:

a monitoring unit configured to monitor the running status of the electronic device and the gesture.

According to a fifth aspect of the embodiments of the present disclosure, wherein the control apparatus further includes:

a second control unit configured to generate a second control signal according to a control signal other than the first control signal and/or a detection result other than the detection result and the first control signal, the second control signal controlling the electronic device to perform a function corresponding to the second control signal.

According to a sixth aspect of the embodiments of the present disclosure, an electronic device is provided, including the control apparatus according to any one of aspects 1 to 5.

According to a seventh aspect of the embodiments of the present disclosure, a control method of an electronic device is provided, including:

detecting a user's contact with the electronic device and acquiring a detection result;

recognizing a gesture of the user holding the electronic device according to the detection result; and generating a first control signal according to the gesture and a first correspondence between the gesture and the first control signal, the first control signal controlling the electronic device to perform a function corresponding to the first control signal.

According to an eighth aspect of the embodiments of the present disclosure, wherein the control method further includes:

generating the first correspondence according to a second correspondence between a running status of the electronic device and the gesture.

According to a ninth aspect of the embodiments of the present disclosure, wherein the control method further includes:

monitoring the running status of the electronic device and the gesture.

According to a tenth aspect of the embodiments of the present disclosure, wherein the control method further includes:

generating a second control signal according to a control signal other than the first control signal and/or a detection result other than the detection result and the first control signal, the second control signal controlling the electronic device to perform a function corresponding to the second control signal.

Embodiments of the present disclosure may have the following beneficial effect: the gesture of the user holding the electronic device is recognized, and a control signal is generated according to the gesture to control the electronic device to perform a function corresponding to the control signal, so that the user controls the electronic device more conveniently.

These and other aspects of the present disclosure will be clear with reference to the subsequent descriptions and drawings, which disclose embodiments of the present disclosure to indicate some implementations of the principles of the present disclosure. But it shall be appreciated that the scope of the present disclosure is not limited thereto, and the present disclosure includes all the changes, modifications and equivalents falling within the scope of the spirit and the connotations of the accompanying claims.

Features described and/or illustrated with respect to one embodiment can be used in one or more other embodiments in a same or similar way, and/or by being combined with or replacing the features in other embodiments.

To be noted, the term "comprise/include" used herein specifies the presence of feature, element, step or component, not excluding the presence or addition of one or more other features, elements, steps or components or combinations thereof.

Many aspects of the present disclosure will be understood better with reference to the following drawings. The components in the drawings are not necessarily drafted in proportion, and the emphasis lies in clearly illustrating principles of the present disclosure. For the convenience of illustrating and describing some portions of the present disclosure, corresponding portions in the drawings may be enlarged, e.g., being more enlarged relative to other portions than the situation in the exemplary device practically manufactured according to the present disclosure. The parts and features illustrated in one drawing or embodiment of the present disclosure may be combined with the parts and features illustrated in one or more other drawings or embodiments. In addition, the same reference signs denote corresponding portions throughout the drawings, and they can be used to denote the same or similar portions in more than one embodiment.

BRIEF DESCRIPTION OF THE DRAWINGS

The included drawings provide further understanding of the present disclosure, and they constitute a part of the Specification. The drawings illustrate preferred embodiments of the present disclosure, and explain principles of the present disclosure together with the text, wherein the same element is always denoted with the same reference sign, in which.

DESCRIPTION OF THE EMBODIMENTS

The embodiments of the present disclosure will be described as follows with reference to the drawings. Those embodiments are just exemplary, rather than limitations to the present disclosure.

Embodiment 1

Figure 1:
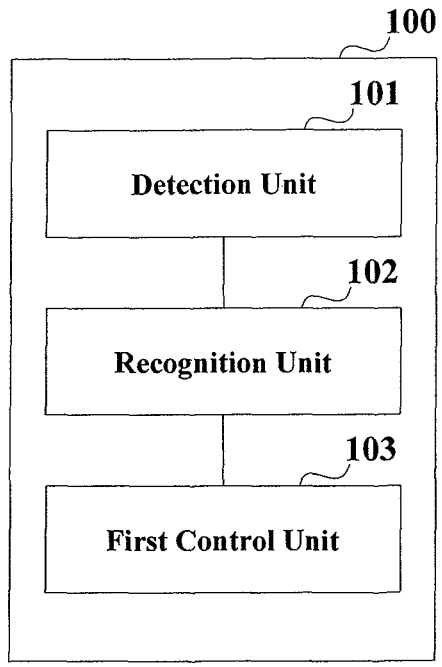
FIG. 1 is a structural diagram of a control apparatus in Embodiment 1 of the present disclosure.

Embodiment 1 of the present disclosure provides a control apparatus of an electronic device. (An exemplary electronic device is shown at 1000 in FIG. 10.) FIG. 1 is a structural diagram of the control apparatus in Embodiment 1 of the present disclosure. As illustrated in FIG. 1, the control apparatus 100 includes a detection unit 101, a recognition unit 102 and a first control unit 103.

The detection unit 101 detects a user's contact with the electronic device, and acquires a detection result. The recognition unit 102 recognizes a gesture of the user holding the electronic device according to the detection result. The first control unit 103 generates a first control signal, according to the gesture and a correspondence, which is referred to below as "first correspondence," between the gesture and the first control signal. The first control signal controls the electronic device to perform a function corresponding to the first control signal.

According to the embodiment of the present disclosure, the user can control the electronic device by holding the electronic device in a particular gesture, without inputting any control signal to the electronic device, thereby improving the convenience of the control of the electronic device.

In the embodiment, the detection unit 101 may be implemented by a detection element disposed on the surface of the electronic device. The detection element, which is described further with respect to detection element 200 that is shown in FIG. 2, for example, may be disposed on one or more outer surfaces of the electronic device.

In the embodiment, the detection element may be capable of detecting a contact position, a contact area or a contact pressure. For example, the detection element may be a touch screen, a touch panel or a pressure sensor array. For example, the touch screen or the touch panel can detect the information such as the contact position and the contact area, while the pressure sensor array can further detect the contact pressure in addition to the information such as the contact position and the contact area. The touch screen, the touch panel and the pressure sensor detect the contact position, the contact area and the contact pressure in the ways similar to those in the relevant art, which are omitted herein.

Figure 2:
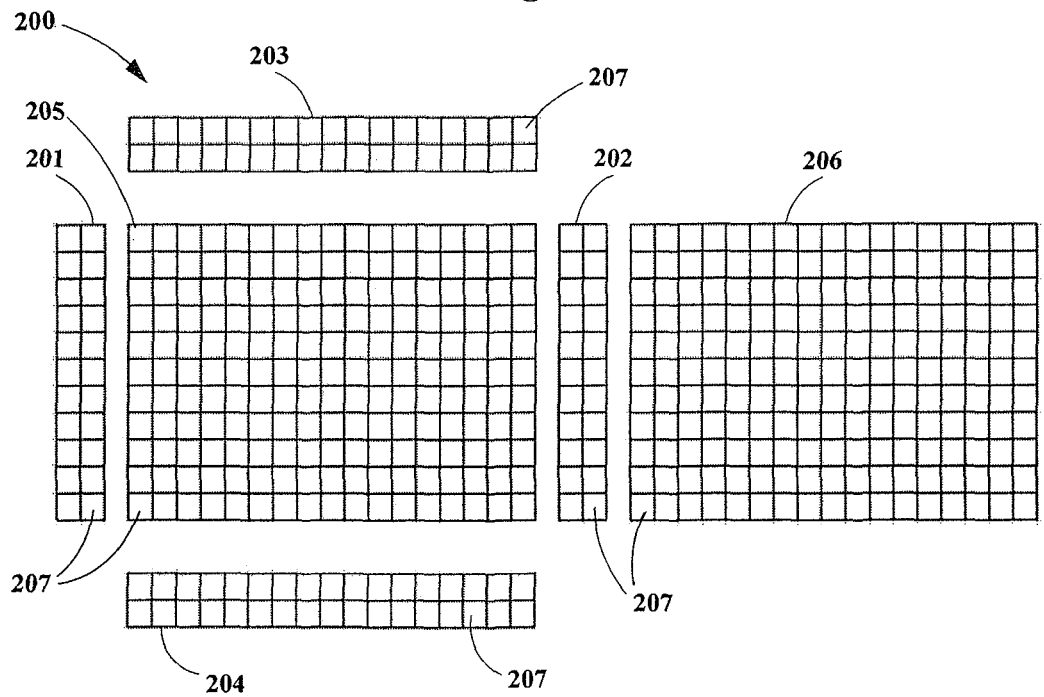
FIG. 2 is a structural diagram of a detection element in Embodiment 1 of the present disclosure.

FIG. 2 is a schematic diagram of a detection element collectively shown at 200, disposed on the outer surface of the electronic device. This exemplary description is made by considering an electronic device having a hexahedral shape as an example. As illustrated in FIG. 2, the detection elements 201~206 are disposed on the six outer surfaces of the electronic device, wherein each of the detection elements may be composed of a plurality of detection micro units 207 arranged as an array. Of course, the embodiment of the present disclosure is not limited thereto, and the detection elements may be only disposed on some surfaces of the electronic device.

In the embodiment, the recognition unit 102 (FIG. 1) may match a detection signal of the detection unit 101 with template data corresponding to the gesture, so as to recognize the gesture of the user holding the electronic device.

In the embodiment, the control apparatus 100 may prestore the template data corresponding to the gesture, and the template data is different for various gestures. The template data may be the data corresponding to the gesture, such as position data, area data and/or pressure value. The template data may be set in advance according to the user's usage habit, e.g., the template data may be set according to the left-handed habit and the right-handed habit, respectively.

In the embodiment, the recognition unit 102 may compare a detection value (e.g., a contact position, a contact area and/or a contact pressure value) in a contact detection signal with the template data (e.g., position data, area data and/or pressure value), and determines the template data matched with the detection signal according to the comparison result. Thus, a gesture corresponding to the determined template data matched with the detection signal is the gesture corresponding to the detection signal.

In the embodiment, when the following conditions are satisfied, it can be determined that the detection signal is matched with the template data:

a first difference between the contact position and the position data in the template data is less than a first threshold, a second difference between the detected contact area and the area data in the template data is less than a second threshold, and/or a third difference between the detected contact pressure value and the pressure value in the template data is less than a third threshold.

In the embodiment, when the detection signal is matched with multiple template data, the minimum template data corresponding to the first difference, the second difference and/or the third difference may be selected as the matched template data.

In the embodiment, the first control unit 103 generates a first control signal according to the gesture recognized by the recognition unit and the first correspondence between the gesture and the first control signal, the first control signal controlling the electronic device to perform a function corresponding to the first control signal. For example, when the electronic device is a cell phone, the function may be starting the camera, opening the phonebook, opening the inbox, disabling the sleep mode, etc.

In the embodiment, the first correspondence may be preset. In addition, the control apparatus 100 may also adopt a self-learning mode, e.g., as is described further below, and generate the first correspondence by analyzing the user's usage habit for the electronic device.

In addition, the control apparatus may include a storage unit (not illustrated), which stores the first correspondence.

According to the embodiment of the present disclosure, the user can control the electronic device by holding the electronic device in a particular gesture, without inputting any control signal to the electronic device, thereby improving the convenience of the control of the electronic device. In addition, the gesture recognition accuracy can be further improved by increasing the amount of the template data, and the electronic device can be controlled in more ways according to the gesture.

Embodiment 2

Embodiment 2 of the present disclosure provides a control apparatus of an electronic device. Based on Embodiment 1, in this embodiment, the description is made through an example where the control apparatus generates the first correspondence in the self-learning mode. Contents the same as Embodiment 1 are omitted herein; and the different contents will be described in detail.

Figure 3:
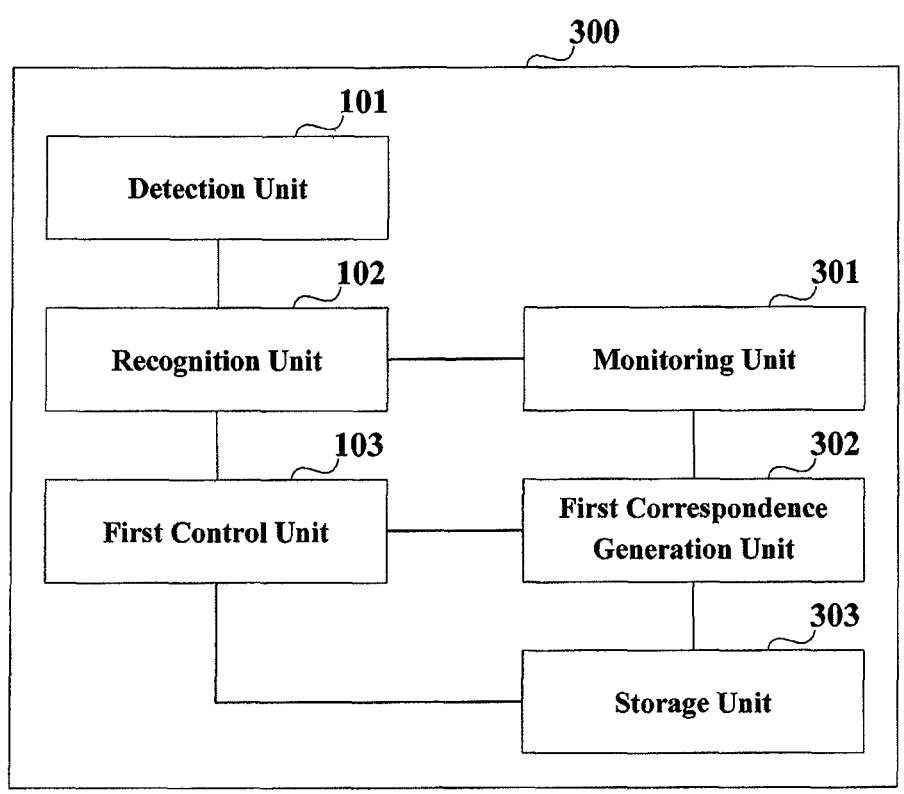
FIG. 3 is a structural diagram of a control apparatus in Embodiment 2 of the present disclosure.

FIG. 3 is a structural diagram of a control apparatus in Embodiment 2 of the present disclosure. As illustrated in FIG. 3, the control apparatus 300 includes a detection unit 101, a recognition unit 102 and a first control unit 103. The functions of them are similar to those in Embodiment 1, and herein are omitted.

As illustrated in FIG. 3, the control apparatus 300 further includes a monitoring unit 301 and a first correspondence generation unit 302, wherein the monitoring unit 301 is configured to monitor a running status of the electronic device 1000, for example, and a gesture, and the first correspondence generation unit 302 is configured to generate the first correspondence according to a second correspondence between the running status of the electronic device and the gesture. In that case, the first control unit 103 may generate a first control signal according to the generated first correspondence.

In addition, as illustrated in FIG. 3, the control apparatus 300 may further include a storage unit 303 configured to store the generated first correspondence, for a usage by the first control unit 103.

In the embodiment, the monitoring unit 301 may monitor the running status of the electronic device by reading related information in the running log of the electronic device. For example, the related information may be the information of application programs run by the electronic device at different timing or periods.

In the embodiment, the monitoring unit 301 may further receive recognition results at different timing or periods transmitted by the recognition unit 102, so as to monitor the gesture of the user holding the electronic device.

In the embodiment, after the monitoring unit 301 monitors the running status of the electronic device and the gesture, the first correspondence generation unit 302 may generate the second correspondence according to the running status and the gesture monitored in a predetermined time. The time length and/or frequency where the running status and the gesture occur simultaneously in the predetermined time may be counted, and the second correspondence is generated when the counting result satisfies a preset condition, such as "the time of simultaneous occurrence is larger than or equal to a certain time threshold", "the time of simultaneous occurrence is the longest", "the frequency of simultaneous occurrence is larger than or equal to a certain frequency threshold" and/or "the frequency of simultaneous occurrence is the highest".

In the embodiment, the first correspondence generation unit 302 may generate the first correspondence according to the second correspondence as follows: determine, according to the correspondence between an application program in the electronic device and a start control signal, a first control signal in a running status corresponding to the application program, and generate the first correspondence between the first control signal and the gesture in conjunction with the second correspondence between the running status and the gesture.

In the embodiment 2, two examples are provided here regarding the above comments "the time of simultaneous occurrence is the longest, e.g., largest" and "the frequency of simultaneous occurrence is the highest, e.g., largest." In operation of the device 1000, for example, many sets of running status and gesture that occur simultaneously could be detected, shown as in the following table for example:

| Set No. | Running status No. | Gesture No. | The time of simultaneous occurrence | The frequency of simultaneous occurrence |
|---|---|---|---|---|
| 1 | A | ① | 30 minutes | 4 times/day |
| 2 | A | ② | 45 minutes | 10 times/day |

-continued

| Set No. | Running status No. | Gesture No. | The time of simultaneous occurrence | The frequency of simultaneous occurrence |
|---|---|---|---|---|
| 3 | B | ① | 60 minutes | 2 times/day |
| 4 | C | ③ | 10 minutes | 15 times/day |

In one example, regarding to Set No. 3 shown in the table, the time of simultaneous occurrence of "Running status B and Gesture ①" is 60 minutes, which is the longest, e.g., largest, time in the 4 sets, so the second correspondence could be formed between Running status B and Gesture ①.

In another example, regarding to Set No. 4 shown in the table, the frequency of simultaneous occurrence of "Running status C and Gesture ③" is 15 times/day, which is the highest, e.g., the largest, frequency in the 4 sets, so the second correspondence could be formed between Running status C and Gesture ③.

According to the embodiment of the present disclosure, the correspondence between the gesture of the user holding the electronic device and the first control signal can be set automatically according to the user's usage habit of the electronic device. Thus the user can control the electronic device by holding the electronic device in a habitual gesture, without inputting any control signal to the electronic device, thereby improving the convenience of the control of the electronic device.

Embodiment 3

Embodiment 3 of the present disclosure provides a control apparatus of an electronic device, which can combine other control signal and/or the detection result with the first control signal to control the electronic device.

Figure 4:
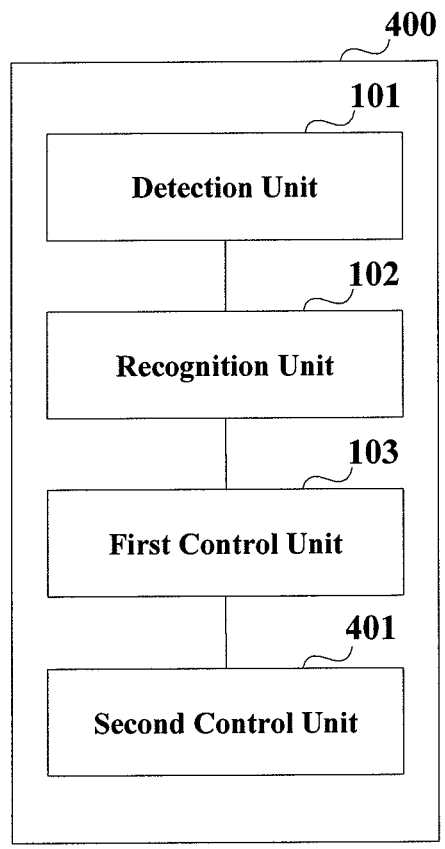
FIG. 4 is a structural diagram of a control apparatus in Embodiment 3 of the present disclosure.

FIG. 4 is a structural diagram of a control apparatus in Embodiment 3 of the present disclosure. As illustrated in FIG. 4, the control apparatus 400 includes a detection unit 101, a recognition unit 102 and a first control unit 103. The functions of them are similar to those in Embodiments 1 and 2, and herein are omitted.

As illustrated in FIG. 4, the control apparatus 400 further includes a second control unit 401 configured to generate a second control signal for the electronic device according to another control signal for the electronic device and/or another detection result and the first control signal, the second control signal controlling the electronic device to perform a function corresponding to the second control signal, such as starting a microphone and automatically recording sounds or prevent the screen from automatically rotating.

In the embodiment, the another control signal may be a control signal other than the first control signal, such as a control signal running a certain application program and/or a control signal finishing running the certain application program. In the embodiment, the another detection result may be a detection result different from the contact detection result generated by the detection unit 101, such as a detection result of a gravity sensor, a light sensor and/or a distance sensor.

In the embodiment, it is also possible to set the another control signal and/or the another detection result and a third correspondence between the first control signal and the second control signal, so as to generate the second control signal according to the another control signal and/or the another detection result, the first control signal and the third correspondence. To be noted, if the second control unit 401 only receives the first control signal rather than another control signal or another detection result, it may output a second control signal the same as the first control signal.

According to the embodiment of the present disclosure, the second control signal for the electronic device can be generated according to the user's usage habit of the electronic device and in conjunction with other control signal and/or detection result, thereby improving the convenience of the control of the electronic device.

Embodiment 4

The control apparatus in the embodiment of the present disclosure will be described as follows in conjunction with specific examples. In the embodiment, the electronic device may be, but not limited to, a cell phone, and other device may also be used.

In the embodiment, the electronic device 500 may have a hexahedral shape, and detection elements may be disposed on all the six surfaces of the electronic device.

In the embodiment, template data (e.g., position data) corresponding to the gesture may be pre-stored in the control apparatus. The control apparatus may also pre-store a first correspondence between the gesture and the first control signal.

In the embodiment, it may be judged whether the user holds the electronic device, and if so, the recognition unit recognizes the gesture of the user holding the electronic device according to the detection result of the detection unit. It may be judged whether the user holds the electronic device according to a variation range of the contact position in a predetermined time. For example, in the predetermined time, if the variation range of the contact position is smaller than a predetermined threshold, it may be judged that the user holds the electronic device. Of course, other manners may be adopted to judge whether the user holds the electronic device, and herein are omitted.

Figure 5:
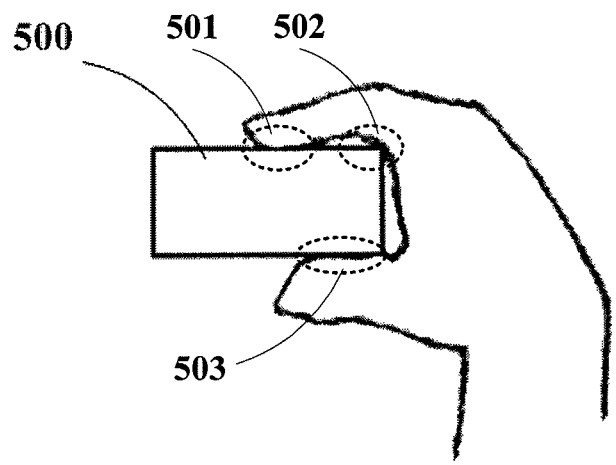
FIG. 5 is a schematic diagram in which a user holds an electronic device in Embodiment 4 of the present disclosure.

FIG. 5 is a schematic diagram in which a user holds an electronic device in Embodiment 4 of the present disclosure. When holding the electronic device 500 in the gesture as illustrated in FIG. 5, the user contacts the outer surface of the electronic device 500, and the contact position is indicated by the broken circles 501-503 in FIG. 5.

Figure 6:
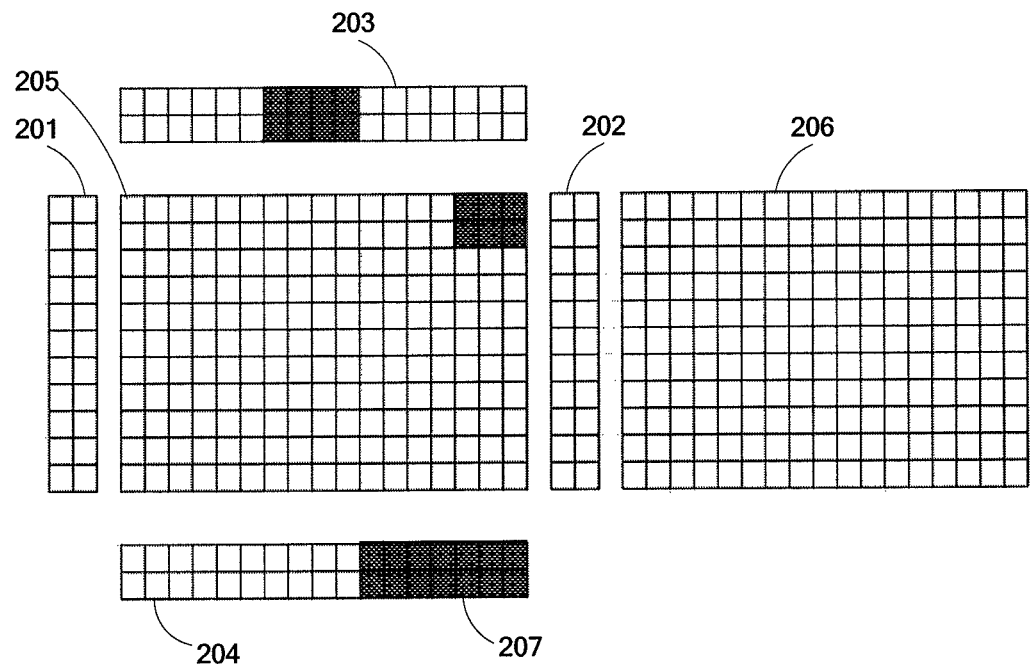
FIG. 6 is a schematic diagram of a detection result in Embodiment 4 of the present disclosure.

FIG. 6 illustrates a detection result corresponding to the holding gesture in FIG. 5. As illustrated in FIG. 6, the detection elements 203, 204 and 205 disposed on the left side, the right side and the front side of the electronic device 500 detect the user's touch, respectively, and the detection micro units 207 detecting the contact output a detection signal, which may be a contact position signal. In FIG. 6, the shaded grids represent the detection micro units detecting the contact.

When the contact position illustrated in FIG. 6 is matched with the template data pre-stored in the recognition unit 102, the recognition unit 102 recognizes the detection result as a gesture corresponding to the template data. For example, the gesture may be denoted as "gesture 1".

Figure 7:
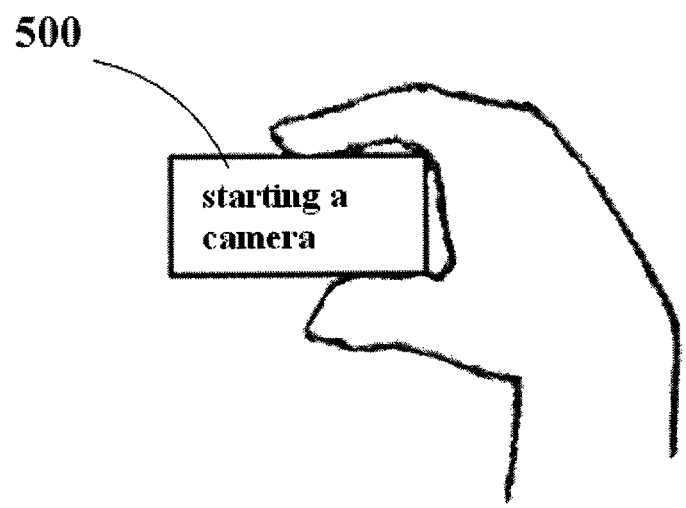
FIG. 7 is a schematic diagram in which an electronic device is controlled according to a first control signal in Embodiment 4 of the present disclosure.

The first control unit 103 generates a first control signal according to the gesture recognized by the recognition unit 102 and the correspondence between the gesture and the first control signal. FIG. 7 is a schematic diagram in which an electronic device is controlled according to a first control signal in Embodiment 4 of the present disclosure. As illustrated in FIG. 7, the first control signal can start a camera of the electronic device 500.

Thus, the user can start the camera of the electronic device according to the holding gesture just by holding the electronic device, rather than picking up the electronic device and clicking a particular key to start the camera of the electronic device. Therefore, the control apparatus of the electronic device in the embodiment can simplify the user's operations.

Moreover, in the embodiment, the template data may further be area data and/or pressure data, and the detection element may further output a detection signal reflecting a contact area and/or a contact pressure. Thus, the recognition unit 102 may recognize a gesture according to the contact position, the contact area, the contact pressure or combinations thereof. The specific recognition manner is similar to the manner of recognizing a gesture according to the contact position, and herein is omitted.

Moreover, in the embodiment, the first correspondence used by the control apparatus is preset to simplify the structure of the control apparatus. Of course, the manner of Embodiment 2 may also be used to form the first correspondence by self-learning, thereby improving the convenience of the control of the electronic device.

Moreover, the control apparatus may further include a second control unit 401 configured to generate a second control signal according to the received first control signal and the detection result of other sensor. For example, when the second control unit 401 receives a proximity object detection signal transmitted by a distance sensor, it means that there is an obstacle around the electronic device. A typical scene is that the electronic device is located in the user's pocket or bag, and it is unsuitable to start to the camera of the electronic device. Thus, when the user holds the electronic device in the gesture as illustrated in FIG. 5, the second control unit 401 may generate the second control signal according to the camera start signal generated by the first control unit 103 and the proximity object detection signal generated by the distance sensor. For example, the second control signal may be a control signal for starting a microphone of the electronic device and automatically recording sounds.

Figure 8:
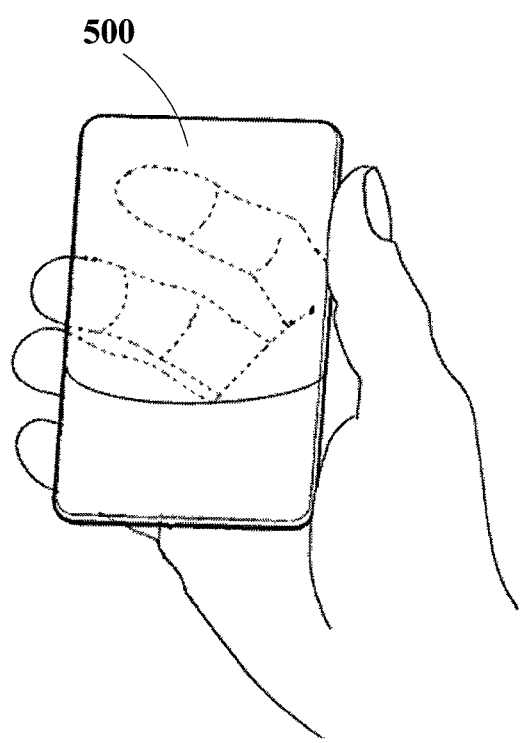
FIG. 8 is another schematic diagram in which a user holds an electronic device in Embodiment 4 of the present disclosure.
Figure 9:
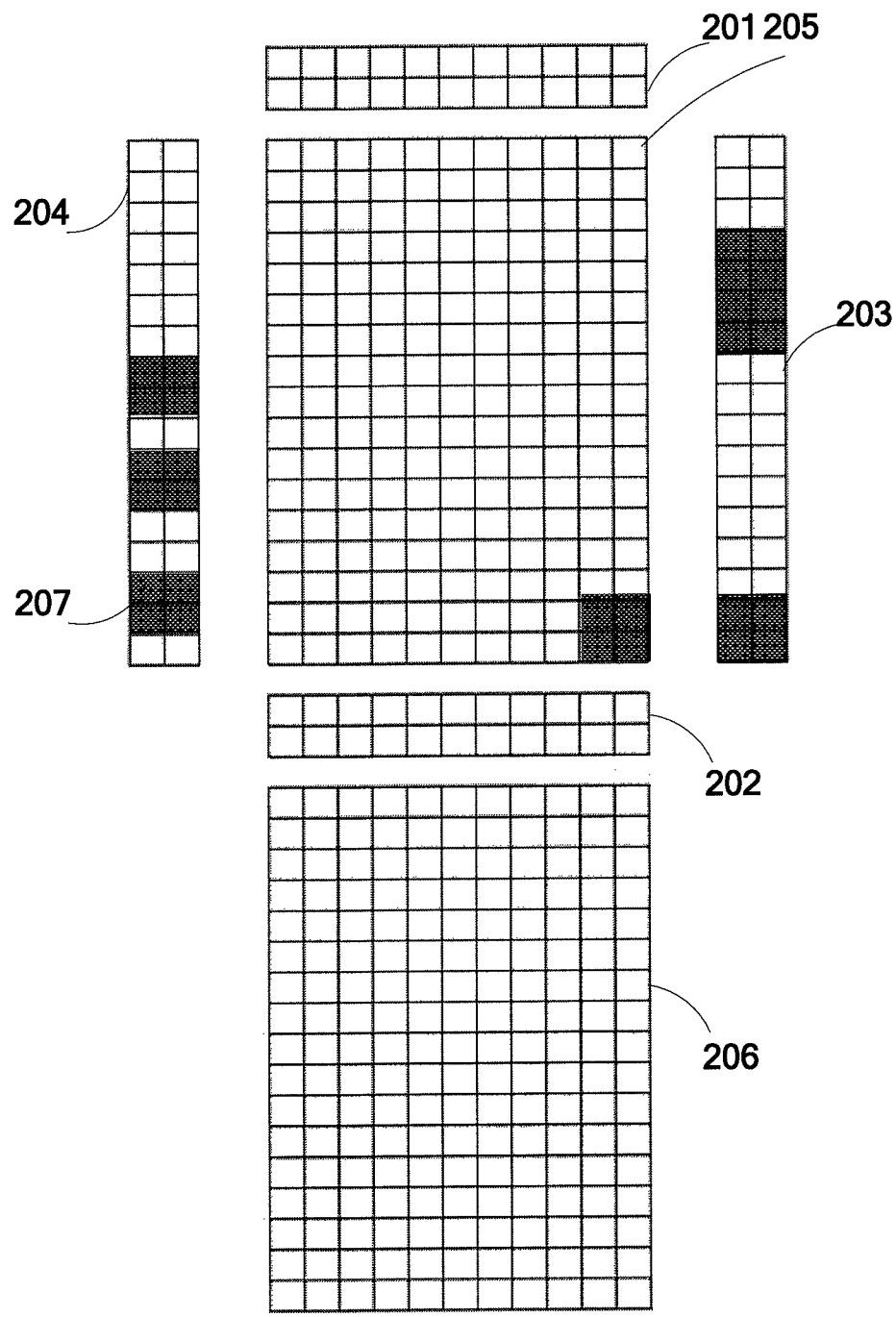
FIG. 9 is another schematic diagram of a detection result in Embodiment 4 of the present disclosure.

FIG. 8 is another schematic diagram in which a user holds an electronic device in Embodiment 4 of the present disclosure, and FIG. 9 illustrates a detection result of the detection element of the detection unit 101 when the user holds the electronic device in the gesture as illustrated in FIG. 8.

For the holding gesture as illustrated in FIG. 8, the first control unit 103 may generate a "sleep mode disable control signal" as the first control signal, according to which the electronic device will not enter the sleep mode even if it does not receive any new control command for a long time, thereby preventing the user from being interfered with by the sleep mode when reading electronic books, browsing web pages or viewing video data. In addition, the second control unit 401 may further receive a "screen automatic rotation control signal" for enabling the display screen of the electronic device to automatically rotate according to the detection result of the gravity sensor, and the "sleep mode disable control signal", and generate a "screen automatic rotation prevention control signal" as the second control signal, according to which the display screen will not rotate automatically no matter how the electronic device rotates. Thus, the display screen will not automatically rotate whether the user is standing, lying on his side, or lying flat once the user holds the electronic device in the gesture as illustrated in FIG. 8. Therefore, the user does not need to shut off the "screen automatic rotation control signal" through a menu selection or a key pressing.

According to the embodiment of the present disclosure, the user can control the electronic device by holding the electronic device in a particular gesture, without inputting any control signal to the electronic device, thereby improving the convenience of the control of the electronic device.

Embodiment 5

The embodiment of the present disclosure further provides an electronic device including the control apparatus according to Embodiments 1 to 4.

Figure 10:
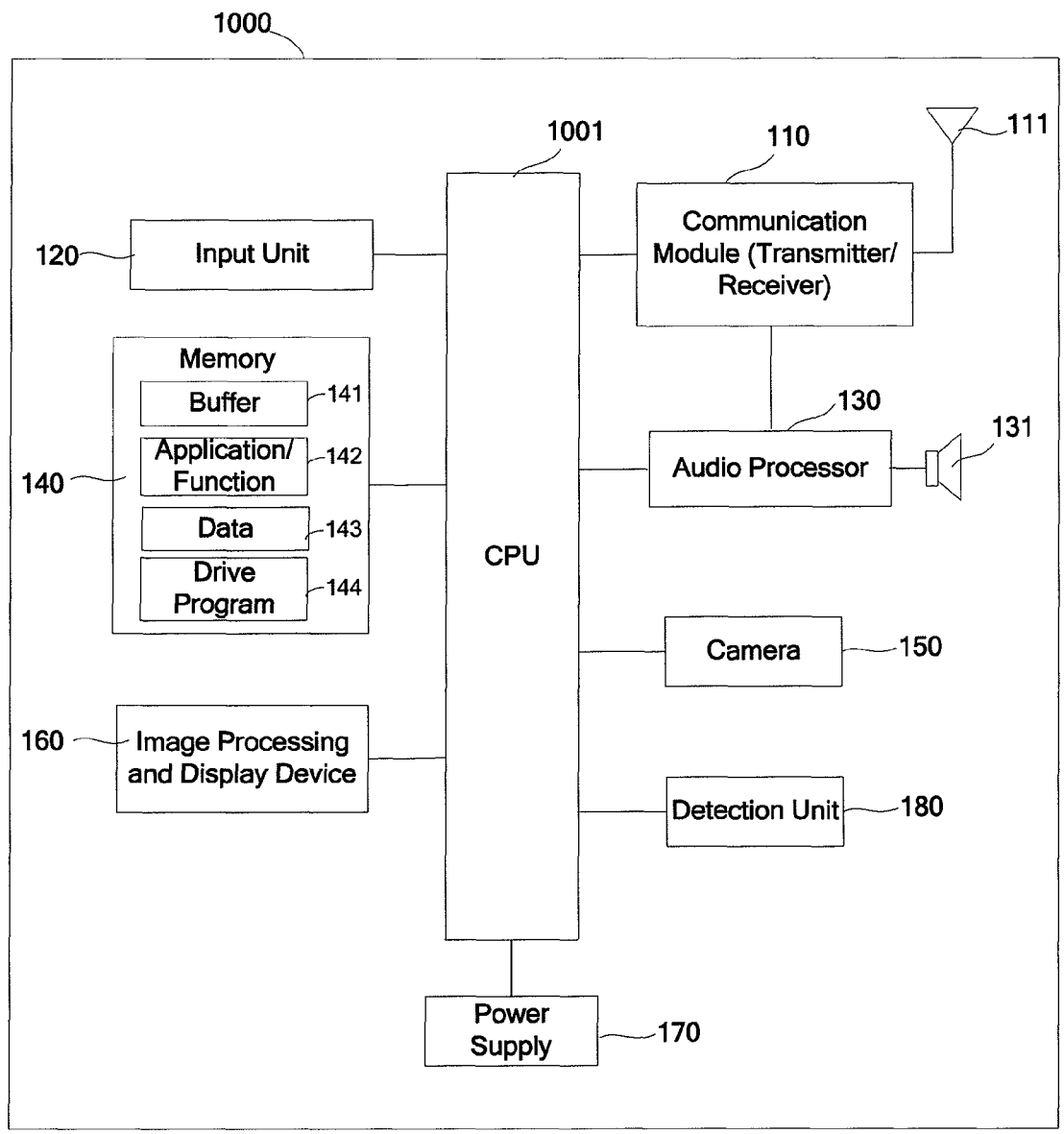
FIG. 10 is a schematic diagram of a system construction of an electronic device in Embodiment 5 of the present disclosure.

FIG. 10 is a block diagram of a system construction of an electronic device 1000 in the embodiment of the present disclosure, including the control apparatus according to Embodiments 1 to 3 of the present disclosure. To be noted, the diagram is exemplary, and other type of structure may be used to supplement or replace the structure to realize the telecom function or other function.

As illustrated in FIG. 10, the electronic device 1000 may include a Central Processing Unit (CPU) 1001, a communication module 110, an input unit 120, an audio processor 130, a memory 140, a camera 150, an image processing and display device 160, a power supply 170 and a detection unit 180, wherein the detection unit 180 is configured to detect a user's contact with the electronic device and acquire a detection result. The working principle of the detection unit 180 is the same as that of the detection unit 103 in Embodiments 1 to 4, and herein is omitted.

The CPU 1001 (sometimes called as controller or operation control, including microprocessor or other processor device and/or logic device) receives an input and controls respective parts and operations of the electronic device 1000.

In the embodiment, the CPU 1001 is configured to recognize a gesture of the user holding the electronic device according to the detection result of the detection unit 180, and generate a first control signal according to the gesture and a first correspondence between the gesture and the first control signal, the first control signal controlling the electronic device to perform a function corresponding to the first control signal.

In addition, the CPU 1001 is further configured to generate the first correspondence according to a second correspondence between a running status of the electronic device and the gesture.

In addition, the CPU 1001 is further configured to monitor the running status of the electronic device and the gesture.

In addition, the CPU 1001 is further configured to generate a second control signal according to a control signal other than the first control signal and/or a detection result other than the detection result of the detection unit 180 and the first control signal, the second control signal controlling the electronic device to perform a function corresponding to the second control signal.

The input unit 120 provides an input to the CPU 1001. The input unit 120 for example is a key or a touch input device. The camera 150 captures image data and supplies the captured image data to the CPU 1001 for a conventional usage, such as storage, transmission, etc.

The power supply 170 supplies electric power to the electronic device 1000. The image processing and display device 160 processes and displays objects such as images, videos and texts.

The memory 140 is coupled to the CPU 1001. The memory 140 may be a solid state memory, such as Read Only Memory (ROM), Random Access Memory (RAM), SIM card, etc., or a memory which stores information even if the power is off, which can be selectively erased and provided with more data, and the example of such a memory is sometimes called as EPROM etc. The memory 140 also may be a certain device of other type. The memory 140 includes a buffer memory 141 (sometimes called as buffer). The memory 140 may include an application/function storage section 142 which stores application programs and functional programs or performs the operation procedure of the electronic device 1000 via the CPU 1001.

The memory 140 may further include a data storage section 143 which stores data such as the first correspondence, the second correspondence and the template data in Embodiments 1 to 4 of the present disclosure. A drive program storage section 144 of the memory 140 may include various drive programs of the electronic device for performing the communication function and/or other functions (e.g., message transfer application, address book application, etc.) of the electronic device.

The communication module 110 is a transmitter/receiver 110 which transmits and receives a signal via an antenna 111. The communication module (transmitter/receiver) 110 is coupled to the CPU 100 to provide an input signal and receive an output signal, which may be the same as the situation of the conventional mobile communication terminal Based on different communication technologies, a same electronic device may be provided with a plurality of communication modules 110, such as cellular network module, Bluetooth module and/or Wireless Local Area Network (WLAN) module, etc. The communication module (transmitter/receiver) 110 is further coupled to a loudspeaker 131 via an audio processor 130 to provide an audio output via the loudspeaker 131. The audio processor 130 may include any appropriate buffer, decoder, amplifier, etc.

Embodiment 6

Embodiment 6 of the present disclosure provides a control method of an electronic device, which is corresponding to the control apparatus according to Embodiments 1 to 4, and the same contents are omitted herein.

Figure 11:
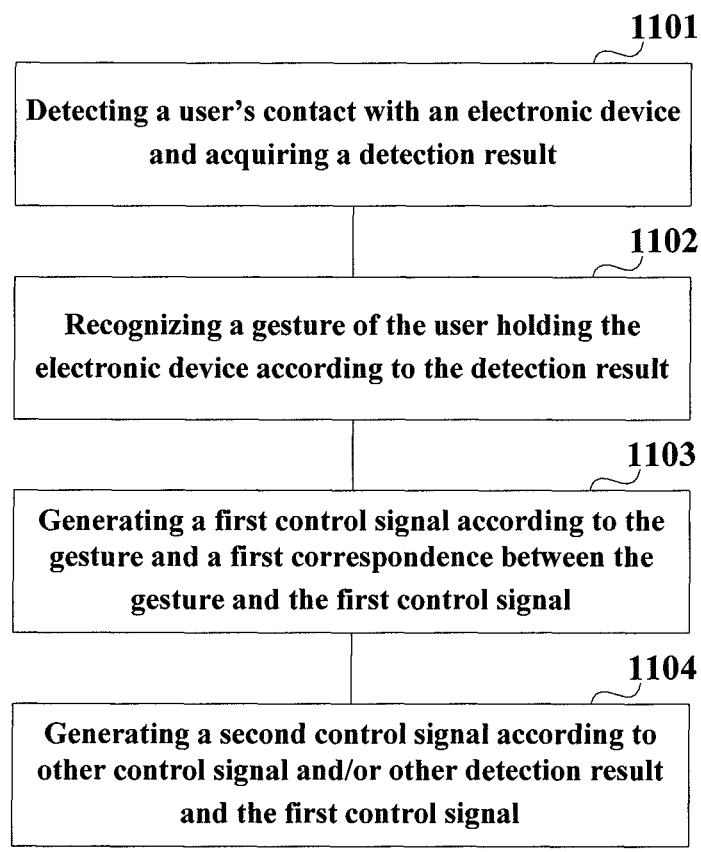
FIG. 11 is a flow diagram of a control method in Embodiment 6 of the present disclosure.

FIG. 11 is a flow diagram of a control method in Embodiment 6 of the present disclosure. As illustrated in FIG. 11, the control method 1100 includes:

Step 1101: detecting a user's contact with the electronic device and acquiring a detection result;

Step 1102: recognizing a gesture of the user holding the electronic device according to the detection result; and Step 1103: generating a first control signal according to the gesture and a first correspondence between the gesture and the first control signal, the first control signal controlling the electronic device to perform a function corresponding to the first control signal.

In addition, in the embodiment, the control method 1100 may further include step 1104: generating a second control signal according to a control signal other than the first control signal and/or a detection result other than the detection result and the first control signal, the second control signal controlling the electronic device to perform a function corresponding to the second control signal.

For the working modes of steps 1101 to 1104 in the embodiment, please refer to the working modes of corresponding units in Embodiments 1 to 4, and herein are omitted.

Figure 12:
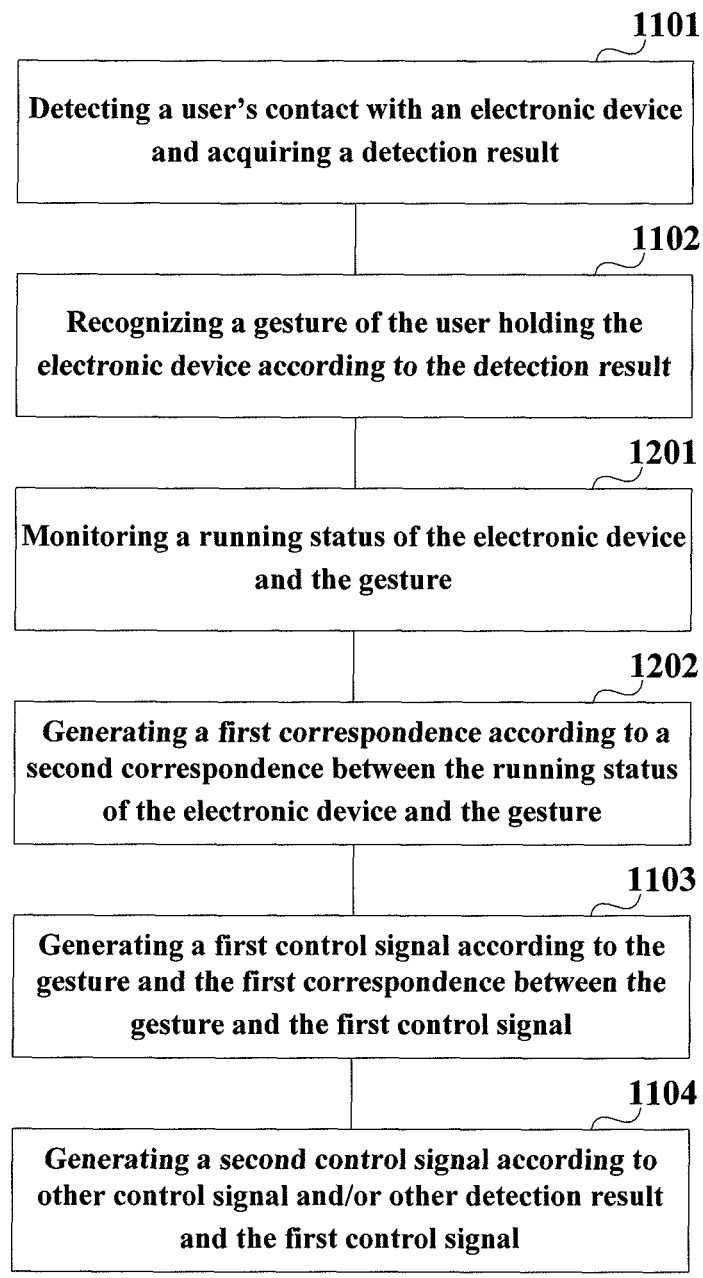
FIG. 12 is another flow diagram of a control method in Embodiment 6 of the present disclosure.

FIG. 12 is another flow diagram of a control method in Embodiment 6 of the present disclosure. As illustrated in FIG. 12, based on the control method as illustrated in FIG. 11, the control method herein may further include steps 1201 and 1202:

Step 1201: monitoring the running status of the electronic device and the gesture; and Step 1202: generating the first correspondence according to a second correspondence between the running status of the electronic device and the gesture.

For the working modes of steps 1201 to 1202 in the embodiment, please refer to the working modes of corresponding units in Embodiment 2, and herein are omitted.

According to the embodiment of the present disclosure, the user can control the electronic device by holding the electronic device in a particular gesture, without inputting any control signal to the electronic device, thereby improving the convenience of the control of the electronic device.

The embodiment of the present disclosure further provides a computer readable program, which when being executed in an electronic device, enables a computer to perform the control method according to Embodiment 6 in the electronic device.

The embodiment of the present disclosure further provides a storage medium storing a computer readable program, wherein the computer readable program enables a computer to perform the control method according to Embodiment 6 in an electronic device.

The preferred embodiments of the present disclosure are described as above with reference to the drawings. Many features and advantages of those embodiments are apparent from the detailed Specification, thus the accompanied claims intend to cover all such features and advantages of those embodiments which fall within the true spirit and scope thereof. In addition, since numerous modifications and changes are easily conceivable to a person skilled in the art, the embodiments of the present disclosure are not limited to the exact structures and operations as illustrated and described, but cover all suitable modifications and equivalents falling within the scope thereof.

It shall be understood that each of the parts of the present disclosure may be implemented by hardware, software, firmware, or combinations thereof. In the above embodiments, multiple steps or methods may be implemented by software or firmware stored in the memory and executed by an appropriate instruction executing system. For example, if the implementation uses hardware, it may be realized by any one of the following technologies known in the art or combinations thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

Any process, method or block in the flowchart or described in other manners herein may be understood as being indicative of including one or more modules, segments or parts for realizing the codes of executable instructions of the steps in specific logic functions or processes, and that the scope of the preferred embodiments of the present disclosure include other implementations, wherein the functions may be executed in manners different from those shown or discussed (e.g., according to the related functions in a substantially simultaneous manner or in a reverse order), which shall be understood by a person skilled in the art.

The logic and/or steps shown in the flowcharts or described in other manners here may be, for example, understood as a sequencing list of executable instructions for realizing logic functions, which may be implemented in any computer readable medium, for use by an instruction executing system, apparatus or device (such as a system based on a computer, a system including a processor, or other systems capable of extracting instructions from an instruction executing system, apparatus or device and executing the instructions), or for use in combination with the instruction executing system, apparatus or device.

The above literal descriptions and drawings show various features of the present disclosure. It shall be understood that a person of ordinary skill in the art may prepare suitable computer codes to carry out each of the steps and processes described above and illustrated in the drawings. It shall also be understood that the above-described terminals, computers, servers, and networks, etc. may be any type, and the computer codes may be prepared according to the disclosure contained herein to carry out the present disclosure by using the apparatuses.

Specific embodiments of the present disclosure have been disclosed herein. A person skilled in the art will readily recognize that the present disclosure is applicable in other environments. In practice, there exist many embodiments and implementations. The appended claims are by no means intended to limit the scope of the present disclosure to the above particular embodiments. Furthermore, any reference to "an apparatus configured to . . . " is an explanation of apparatus plus function for describing elements and claims, and it is not desired that any element using no reference to "an apparatus configured to . . . " is understood as an element of apparatus plus function, even though the wording of "apparatus" is comprised in that claim.

Although a particular preferred embodiment or embodiments have been shown and the present disclosure has been described, it is obvious that equivalent modifications and variants are conceivable to a person skilled in the art in reading and understanding the description and drawings. Especially for various functions executed by the above elements (parts, components, apparatus, and compositions, etc.), except otherwise specified, it is desirable that the terms (including the reference to "apparatus") describing these elements correspond to any element executing particular functions of these elements (i.e. functional equivalents), even though the element is different from that executing the function of an exemplary embodiment or embodiments illustrated in the present disclosure with respect to structure. Furthermore, although the a particular feature of the present disclosure is described with respect to only one or more of the illustrated embodiments, such a feature may be combined with one or more other features of other embodiments as desired and in consideration of advantageous aspects of any given or particular application.

The invention claimed is:

1. A control apparatus of an electronic device, comprising:
a detection unit configured to detect a user's contact with the electronic device, and acquire a detection result, the detection unit including a first detection portion defining a first plane and operative to detect a user's contact with the electronic device, and a second detection portion defining a second plane and operative to detect a user's contact with the electronic device, the first plane being different from the second plane;
a recognition unit configured to recognize a gesture of the user holding the electronic device according to the detection result; and
a first control unit configured to generate a first control signal according to the gesture and a first correspondence between the gesture and the first control signal, the first control signal controlling the electronic device to perform a function corresponding to the first control signal.

2. The control apparatus according to claim 1, wherein, the detection result comprises at least one of a contact position, a contact area or a contact pressure.

3. The control apparatus according to claim 1, further comprising:
a first correspondence generation unit configured to generate the first correspondence according to a second correspondence between a running status of the electronic device and the gesture.

4. The control apparatus according to claim 3, further comprising:
a monitoring unit configured to monitor the running status of the electronic device and the gesture.

5. The control apparatus according to claim 1, further comprising:
a second control unit configured to generate a second control signal according to a control signal other than the first control signal and/or a detection result other than the detection result and the first control signal, the second control signal controlling the electronic device to perform a function corresponding to the second control signal.

6. An electronic device, comprising:
a first outer surface defining a first plane;
a second outer surface defining a second plane, wherein the second plane is different from the first plane; and
the control apparatus according to claim 1, wherein the first detection portion is arranged on the first outer surface and the second detection portion is arranged on the second outer surface.

7. A control method of an electronic device, comprising:
detecting a user's contact with a first outer surface of the electronic device and a second outer surface of the electronic device and acquiring a detection result, wherein the first outer surface defines a first plane and the second surface defines a second plane different from the first plane;
recognizing a gesture of the user holding the electronic device according to the detection result; and
generating a first control signal according to the gesture and a first correspondence between the gesture and the first control signal, the first control signal controlling the electronic device to perform a function corresponding to the first control signal.

8. The control method according to claim 7, further comprising:
generating the first correspondence according to a second correspondence between a running status of the electronic device and the gesture.

9. The control method according to claim 8, further comprising:
monitoring the running status of the electronic device and the gesture.

10. The control method according to claim 7, further comprising:
generating a second control signal according to a control signal other than the first control signal and/or a detection result other than the detection result and the first control signal, the second control signal controlling the electronic device to perform a function corresponding to the second control signal.

11. An electronic device, comprising:
a first outer surface defining a first plane;
a second outer surface defining a second plane, wherein the second plane is different from the first plane; and
the control apparatus according to claim 2, wherein the first detection portion is arranged on the first outer surface and the second detection portion is arranged on the second outer surface.

12. An electronic device, comprising:
a first outer surface defining a first plane;
a second outer surface defining a second plane, wherein the second plane is different from the first plane; and
the control apparatus according to claim 3, wherein the first detection portion is arranged on the first outer surface and the second detection portion is arranged on the second outer surface.

13. An electronic device, comprising:
a first outer surface defining a first plane;
a second outer surface defining a second plane, wherein the second plane is different from the first plane; and
the control apparatus according to claim 4, wherein the first detection portion is arranged on the first outer surface and the second detection portion is arranged on the second outer surface.

14. An electronic device, comprising:
a first outer surface defining a first plane;
a second outer surface defining a second plane, wherein the second plane is different from the first plane; and
the control apparatus according to claim 5, wherein the first detection portion is arranged on the first outer surface and the second detection portion is arranged on the second outer surface.

* * * * *